United States Patent

[11] 3,570,807

| [72] | Inventors | Oded E. Sturman<br>Arleta;<br>Salvatore A. Sciortino, North Hollywood;<br>Abdul R. Kassir, San Gabriel, Calif. |
|---|---|---|
| [21] | Appl. No. | 791,026 |
| [22] | Filed | Jan. 14, 1969 |
| [45] | Patented | Mar. 16, 1971 |
| [73] | Assignee | Bell Aerospace Corporation |

[54] ELECTROMECHANICAL CONTROL VALVE
4 Claims, 4 Drawing Figs.

[52] U.S. Cl. ........................................... 251/65,
251/129, 251/75, 251/282
[51] Int. Cl. ........................................... F16k 31/08,
F16k 31/10
[50] Field of Search ........................................... 251/65,
129, 75, 282

[56] References Cited
UNITED STATES PATENTS

| 3,368,788 | 2/1968 | Padula | 251/65 |
| 3,373,769 | 3/1968 | Chaves et al. | 251/129X |
| 3,379,214 | 4/1968 | Weinberg | 251/65X |
| 3,381,931 | 5/1968 | Boonsahft et al. | 251/77X |

*Primary Examiner*—Arnold Rosenthal
*Attorney*—Nilsson, Robbins, Wills & Berliner

ABSTRACT: An electromechanical control valve in which a poppet is magnetically biased against a valve seat and is mechanically unseated upon decrease of the magnetic moment. A suspension plate carries the poppet on one side thereof and an armature on the other side to constitute an integrated assembly. A permanent magnet attracts the armature to thereby bias the poppet against the seat and deform the suspension plate. A coil is disposed on the armature and, when energized, develops a magnetic potential in opposition to the magnetic potential of the permanent magnet to thereby decrease the permanent magnet attraction whereby the deformed suspension plate, acting as a spring, urges the poppet out of the seat. The coil can be disposed so as to positively attract the armature through the null point to an opposite poll. The suspension plate also serves to isolate the magnetic circuit from the poppet-seat area.

INVENTORS
ODED E. STURMAN
ABDUL R. KASSIR
SALVATORE A. SCIORTINO

ATTORNEYS

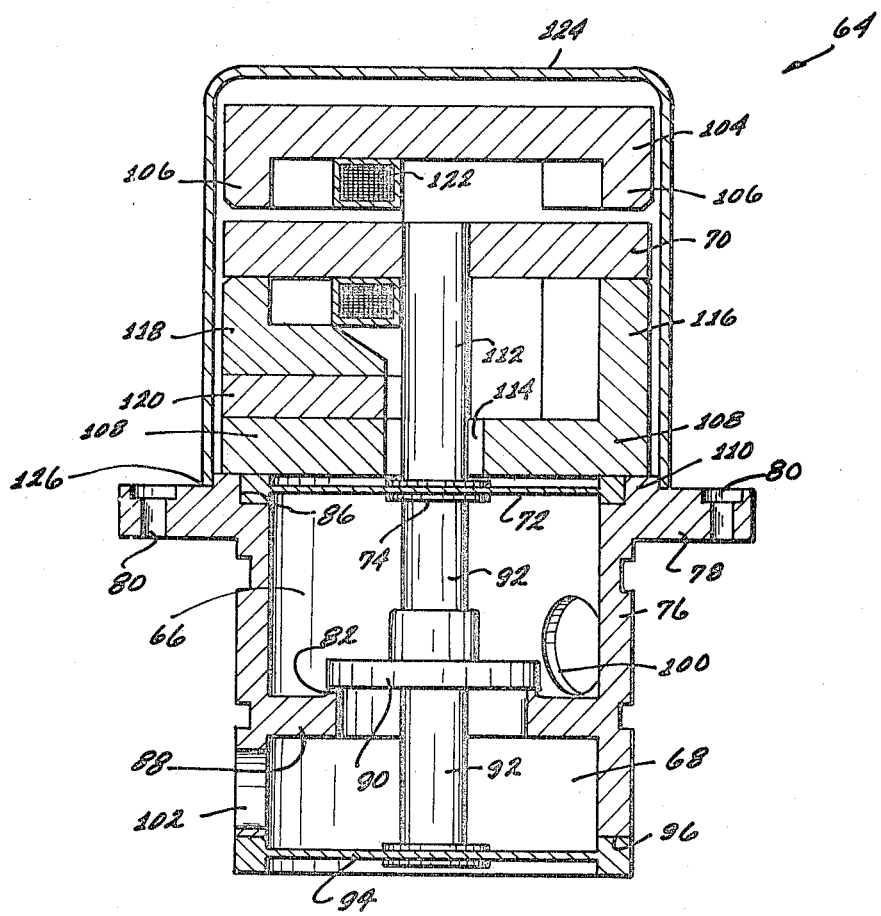

ELECTROMECHANICAL CONTROL VALVE

BACKGROUND OF THE INVENTION

1. Field of the Invention

The fields of art to which the invention pertains includes the fields of fluid handling, valves and valve actuation.

2. Description of the Prior Art

There is a need for lightweight, reliable and responsive on-off valves, particularly for controlling fluid flow in the rocket propulsion industry where such characteristics are critical to the success of a launching. Initially, solenoid valves provided a relatively inexpensive means for controlling fluid flow, but such valves require a relatively long time to build up sufficient magnetic field for actuation. Accordingly, as the demand for higher reliability and faster response increased, the solenoid valve proved to be too limited and torque-motor-operated valves came into use. However, the torque-motor valve contains features relating to symmetry and linearity of force output which are not necessary for on-off actuation and such features penalize other performance characteristics as well as substantially increasing the cost of the device.

SUMMARY OF THE INVENTION

The present invention represents a new generation of on-off valves and is designed specifically for such operation. Unlike the solenoid valve, the present invention utilizes a permanent magnet which has been optimized for on-off actuation. Unlike the torque-motor valve which developes torque on signal, devices of the present invention initially lose torque on signal. The devices of this invention are faster acting, lighter and more compact than present electromechanical switching devices that are designed for the same application. The devices are of relatively simple design and are low in cost. Devices constructed in accordance with this invention have attained 2 millisecond operation under load as compared to 5—7 millisecond operation of existing devices with the same flow area-pressure drop parameters.

Specifically, a valve is provided comprising a valve assembly including a valve head, a seat for the valve head and permanent magnet means for applying a predetermine force on the assembly to bias the valve head to a preselected position with respect to the seat. The valve assembly includes mechanical means that is deformed to a first configuration when the valve head is in the preselected position to urge the valve head in an opposite direction, and means are provided for decreasing the predetermined force whereby the valve head moves in the opposite direction.

In particular embodiments, the valve head is disposed within a chamber having first and second ports, for example, inlet and outlet, and the deformable mechanical means isolates the magnetic circuit from this chamber. The mechanical means includes a suspension plate that supports the valve head on one side and an armature of magnetically permeable material on the other side movable associated with the valve head. A coil is disposed on the armature and is energizable to develop a magnetic potential in opposition to the permanent magnetic potential to thereby decrease the permanent magnet force on the armature. A pole member of magnetically permeable material is disposed adjacent the armature. The coil, when energized, generates sufficient magnetic flux about the pole member to magnetically attract the armature thereto to aid in urging the valve head out of its seat. The coil is also disposed and constructed to develop sufficient magnetic moment to deform the suspension plate to a configuration of opposite spring moment to its first configuration. The result is that static moments are available at all armature positions to accelerate opening and closing of the valve when the coil is energized or deenergized, respectively.

BRIEF DESCRIPTION OF THE DRAWINGS

FIG. 4 is a schematic cross-sectional representation of another valve constructed in accordance with the present invention.

DESCRIPTION OF THE PREFERRED EMBODIMENTS

Figure 1:
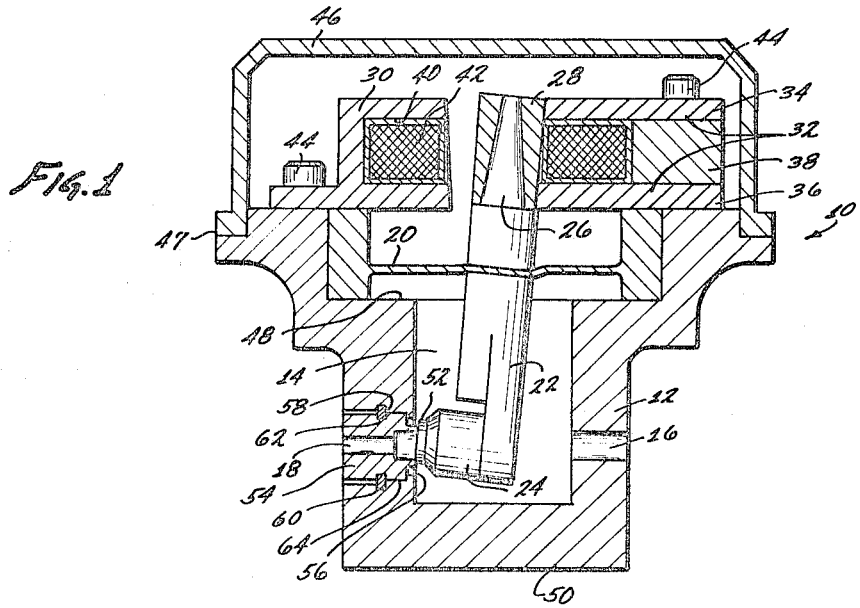
FIG. 1 is a schematic cross-sectional representation of a valve constructed in accordance with the present invention.

Referring to FIG. 1, one embodiment of this invention is illustrated. A valve 10 is shown having a housing 12 defining a chamber 14 and inlet and outlet ports 16 and 18, respectively. One wall of the chamber 14 is defied by a circular suspension plate 20 that completely encloses the chamber 14 at that end thereof and isolates the chamber 14 from the magnetic circuit as more fully explained below. A flapper 22 extends into the chamber 14 from the suspension plate 20 and carries a poppet 24 at its end, A stem 26 is disposed on the other side of the suspension plate 20 as a continuation of the flapper 22. The end of the stem 26 is encased in an armature sleeve 28 of magnetically permeable material and that end is disposed between a pair of magnetic poles 30 and 32. The pole 32, on the right side (in the drawing) of the armature sleeve 28, comprises upper and lower frames 34 and 36, respectively, of magnetically permeable material sandwiching an Alnico permanent magnet 38. The other, left side pole 30 is of one piece of magnetically permeable material and is of U-shaped cross section to define a channel 40 adjacent the armature sleeve 28, A coil 42 is disposed on the armature sleeve 28 and supported within the channel 40 and between the upper and lower frames 34 and 36 on the right side pole 32. The poles 30 and 32 and permanent magnet 38 are secured to the housing 12 by means of screws 44 to provide a rigid assembly and a cover plate 46 is provided overlying the poles 30 and 32 and the coil 42, and it threadably attached to the housing 12 at 47. Electrical leads (not shown) are provided for supplying energizing current to the coil 42.

The circular suspension plate 20 is deformable and serves both as a mechanical spring as well as to isolate the magnet circuit from the chamber 14. The suspension plate 20 is similar to a flat flexure diaphragm only in that is physically separates the chamber 14 from the upper areas of the valve and flexes in response to movement of the armature 28, but it is much thicker and has a spring moment of much greater magnitude than typical flexure diaphragms. The thickness and spring rate of the suspension plate 20 is very important to operation of the valve. The suspension plate 20 must be deformable but thick enough to withstand fluid pressures and have the mechanical strength to return the poppet 24. The suspension plate 20 can be constructed, as shown, as a separate member secured between a shoulder 48 of the housing 12 and the underside of the poles 30 and 32, or it can be a part of the housing 12 itself, i.e., an integral wall thereof formed thin enough to be deformable; the bottom wall 50 of the housing 12 can then be separable from the remainder of the housing 12 and threadable therein to form the enclosed chamber 14.

Referring to the poppet-seat area, the poppet 24 carries an ultra hard tungsten carbide tip 52. A mating tungsten carbide tip 52. A mating tungsten carbide seat 54 is retained within the outlet port 18. The outlet port 18 is provided with an internal annular shoulder 56 and annular groove 58 midway thereof. A retaining ring 60 is disposed within the groove 58 and in an opposing annular groove 62 in the tungsten carbide seat 54. The retaining ring 60 abuts an annular flange 64 on the seat 54 to thereby secure the seat 54 against the port shoulder 56.

In operation, the magnetic attraction of the stem 26, via the magnetically permeable sleeve 28, to the permanent magnet 38 preloads the poppet 24 against the seat 54, preventing fluid flow. To allow maximum transfer of force to the poppet-seat area, the parts are sized so that the poppet tip 52 is pressed firmly against its seat 54 while the armature 28 barely contacts the right side pole 32. When the coil 42 is energized, the permanent magnet 38 potential is overcome and the spring action of the suspension plate 20 causes the armature-flapper-poppet assembly 28-26-22-24-52 to move to an open position. When current to the coil 42 is removed, the armature-flapper-poppet assembly automatically returns to the closed position.

Figure 2:
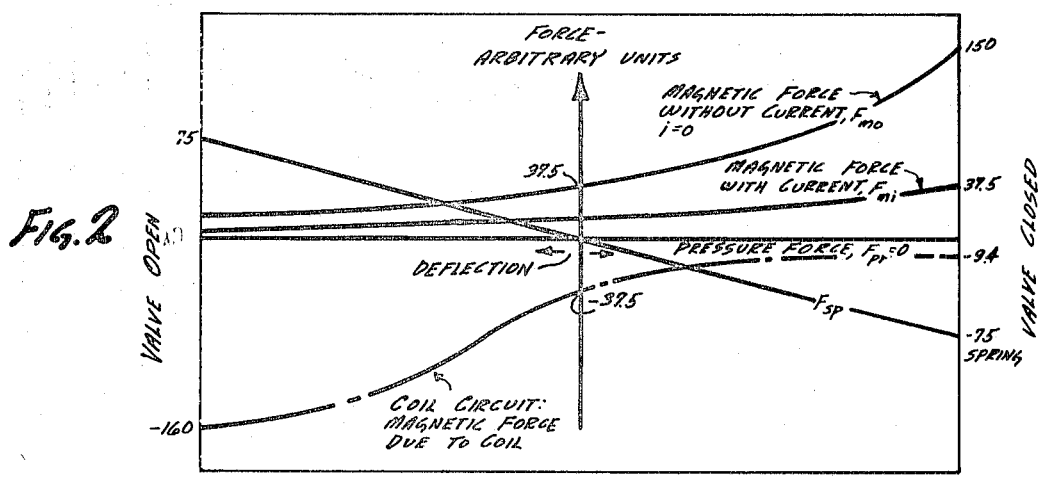
FIG. 2 depicts a moment-deflection plot for valves of this invention.

Referring to the operation of the valve 10 in more detail, FIG. 2 depicts changes in magnetic and spring moment with changes in deflection of he suspension plate 20. The valve 10 is normally closed by a preloading permanent magnet force exerted by the flapper 22 on the popper 24. At the initial, closed position, the preloading magnetic force is at its maximum since, with no air gap, the reluctance of the magnetic circuit thereat is at its minimum. The suspension plate 20 acting as a spring is unstressed when the poppet 24 is positioned midway between the open and closed position, but exerts a force opposing the permanent magnet moment when the poppet 24 is seated. Accordingly, the preloading force is equal to the moment generated by the magnetic force of the permanent magnet 38 minus the moment required to bend the suspension plate 20 per unit length of the flapper 22. With reference to FIG. 2, the preloading force is equal to $F_{mo}$ minus $F_{sp}$ (150−75)=75 units of force.

Figure 3:
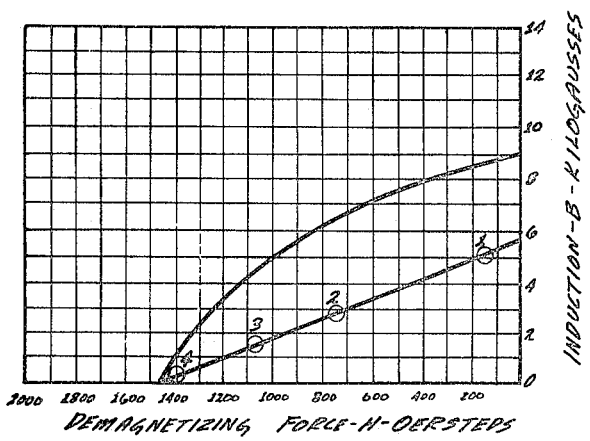
FIG. 3 depicts a typical demagnetization curve for an Alnico VIII permanent magnet.

When the coil 42 is energized, magnetic potential is developed across the armature sleeve 28. This potential opposes the permanent magnet 38 potential, thereby decreasing the force due to the permanent magnet 38. This effect can be illustrated with reference to FIG. 3 which depicts the energy product curves and major (A) and minor (B) hysteresis loop curves of an Alnico VIII permanent magnet. Importantly demagnetization occurs on the minor hysteresis loop (B) as illustrated by conditions 1—4 thereof.

Referring back to FIG. 2, when the coil 42 is energized as described, the permanent magnet potential is decreased to 37.5 force units. The coil 42 potential also generates magnetic flux about the left side pole 30 loop at all position throughout the air gap there at of, say, 9.4 force units. The result is that the net magnetic moment (in FIG. 1, the right side minus the left side moments) is only 28.1 units which is opposed by the spring bending moment of the suspension plate 20 of 75 units minus the pressure moment of the fluid between the ports 16 and 18 (here zero). This results in a total net amount of −46.9 units to move the armature-flapper-poppet assembly 28-26-22-24-52 from the closed position to the open position. At the spring null position of the suspension plate 20, the magnetic potential of the permanent magnet 38 is only 9.4 units which is opposed by a magnetic potential of about 37.5 units from the coil for a total net moment of −28.1 units to accelerate the armature-flapper-poppet assembly 28-26-22-24-52 past the null point. At the open valve position, with the coil 42 energized, a coil magnetic potential of 160 units opposes the permanent magnet 38 potential of 4.7 units and a spring moment of 75 units for a total net force of −80.3 units to bias the valve in the open position. When the current to the coil 42 is removed, the magnetic moment due to the coil 42 ceases whereupon the spring 20 moment of 75 units and the permanent magnet 38 moment, at that point, of 9.4 units accelerate the armature-flapper-poppet assembly 28-26-22-24-52 back to the closed position with a total force of 84.4 units. In passing the null point, the only moment generated, that of the permanent magnet 38, moves the assembly past the null point with a force of 37.5 units to seat the poppet 24. An inspection of the moment-deflection diagram of FIG. 2 reveals that there are static moments available at all armature positions to accelerate the armature-flapper-poppet assembly to an open position with coil current and to a closed position upon the removal of coil current.

Referring to FIG. 4, another embodiment of this invention is illustrated. A valve 64 is shown that is somewhat similar in operation to the valve 10 of FIG. 1, but is constructionally different so that there is no in-line flow between separate upper and lower chambers 66 and 68, respectively. In more detail, the valve 64 of FIG. 2 comprises a generally hollow, cylindrical housing 76 supporting a circular suspension plate (here, more accurately called an isolation spring) 72, similar to the suspension plate 20 of FIG. 1, on an annular shoulder 86 formed on the top inner surface of the cylindrical housing 76 wall.

An annular flange 78 extends outwardly from the top surface of the housing 76 and has screw holes 80 therethrough to allow securement of the valve. An annular flange 88 protrudes inwardly from the inner surface of the cylindrical housing 76 and is shaped to define a seat 82 thereat for a valve poppet 90. A transmission rod 92 extends through the poppet 90 and is secured at its upper end to the isolation spring 72 and at its opposite, lower end to another isolation spring 94. The transmission rod 92 supports and suspends the poppet 90 centrally within the cylindrical housing 76 so that the upper and lower chambers 66 and 68, respectively, are defined when the poppet 90 is in contact with the seat 82. The lower isolation spring 94 is threadably retained at 96 on the end of the cylindrical housing 76 to form a floor for the lower chamber 68. The cylindrical housing 76 has a port 100 formed in an upper portion thereof into the upper chamber 66 and has a port 102 formed in a lower portion thereof into the lower chamber 68. These ports 100 and 102 can serve as inlet and outlet ports, respectively, or vice versa.

The valve can be pressure balanced by utilizing a system geometry that takes into account the effective surface of the poppet 90 and the configurations assumed by the isolation springs 72 and 94 when deformed. In this regard, the isolation springs 72 and 94 function as cantilevered plates and appropriate seat, transmission rod and spring sizes can be calculated utilizing well-known equations. (See for example, cases 19 and 20 on page 222 of "Formulas for Stress and Strain" by R.J. Roark, McCraw HillBrook Co., New York (4 th Edition, 1965). In this manner, the effect of the pressure load on the poppet is cancelled by the opposite forces applied over surfaces of the isolation springs 72 and 94. The result is a pressure balance allowing the sliding of the poppet 90 into and out of the seat 82 with substantial independence of the fluid pressure.

With regard to the actuation mechanism, a support shaft 112 extends by means of a connecting plate 74 as a continuation of the transmission rod 92, through the upper isolation spring 72 and terminates in a perpendicularly set armature 70 of magnetically permeable material. A circular upper frame member 104 of magnetically permeable material is disposed atop the armature 70 and is spaced therefrom by means of flanges 106 extending downwardly from the upper frame member 104. A lower frame member 108 of magnetically permeable material is disposed on the housing 76 and is separated from the upper isolation spring 72 by an outer annular housing flange 110 there at the support shaft 112 extends through an aperture 114 in the lower frame member 108. The armature is supported via the support shaft 112 by the upper isolation spring 72. For maximum transfer of sealing force, in the lowermost, closed position, the armature barely touches a flanged extension 116 of the lower frame member 108 on the right side (in the drawing), and a pole piece 118 on the left side, but the poppet is driven by the transmission rod 92 hard against its seat 82. The pole piece 118 and left side of the lower frame member 108 sandwich an Alnico permanent magnet 120. A coil 122 is disposed on the armature 70 on the pole piece 118 side, between the upper frame member 104 thereat and the pole piece 118. Note, however, that the coil 122 can alternatively be disposed on the opposite side of the shaft 112. Electrical leads (not shown) are provided to the coil 122 for applying current thereto. The pole piece 118, frame means 104 and 108 and permanent magnet 120 are secured to housing 76 by means of screws (not shown). The cover plate 124 is welded to the housing 76 at 124 and overlies the magnetic circuit to provide a rigid assembly.

In operation, the valve 64 is normally closed by a preload force exerted on the poppet 90 that is equal to the moment generated by the permanent magnet 120 minus the moment required to bend the isolation spring, without regard to any pressure differential since the system is pressure balanced. In a closed position, without air gaps, the magnetic force is at its maximum. The magnetic attraction exerted by the permanent magnet 120 is exerted on the armature 70 so as to attract the armature 70 to the pole piece 118 and lower frame member flange 116.

When the coil 122 is energized, magnetic potential is developed across the armature 70 which opposes the permanent magnet 120 potential with a resultant decrease in permanent magnet force. The coil potential also generates magnetic flux about the flanges 106 of the upper frame member 104 at all positions throughout the air gap thereat. When the net magnetic moment equals the spring bending moments of the upper an lower isolation springs 72 and 94, the armature-poppet assembly 70–112–92–20 moves from the closed position to the open position.

In the embodiments of both FIG. 1 and FIG. 4 the suspension plate 28 or isolation springs 72 and 94 not only act as mechanical springs but also isolate the magnetic circuits from the metered fluid. In each of the devices magnetically permeable material is used only in the vicinity of the magnetic circuit so that the fluid chamber area is unaffected by generated magnetic fields.

We claim:

1. An on-off electromechanical valve comprising:
an armature-valve member;
double-acting spring means pivotally supporting said armature-valve member for movement between first and second positions, said spring means applying a predetermined force to said armature-valve member when in its first and second positions urging said armature-valve member away from said first and second positions;
permanent magnet means positioned to apply a force greater than that predetermined force of said spring means to said armature-valve member to move said armature-valve member to said first position; and
electromagnet means positioned, when energized, to 1 reduce the force applied by said permanent magnet means to a value less than that applied by said spring means; and 2 apply a force greater than that predetermined force of said spring means to said armature-valve member to move said armature-valve member to said second position.

2. The valve of claim 1 wherein said armature-valve member includes a valve head disposed in a chamber and a magnetically permeable member spaced from said valve head, said valve head and permeable member being positioned on opposite sides of said spring means, said spring means sealing said electromagnet means from said valve member.

3. The valve of claim 2 wherein said double-acting spring member forms one wall of said chamber.

4. The valve of claim 2 wherein said magnetically permeable member is a sleeve fitted over one end of said armature member, said valve head being at he opposite end thereof.